(12) United States Patent
Oi

(10) Patent No.: US 11,258,551 B2
(45) Date of Patent: Feb. 22, 2022

(54) SERVICE CHAIN DESIGNING DEVICE, SERVICE CHAIN DESIGNING METHOD, AND SERVICE CHAIN DESIGNING PROGRAM

(71) Applicant: Nippon Telegraph and Telephone Corporation, Tokyo (JP)

(72) Inventor: Aiko Oi, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 15/734,292

(22) PCT Filed: May 28, 2019

(86) PCT No.: PCT/JP2019/021127
§ 371 (c)(1),
(2) Date: Dec. 2, 2020

(87) PCT Pub. No.: WO2019/235304
PCT Pub. Date: Dec. 12, 2019

(65) Prior Publication Data
US 2021/0226743 A1  Jul. 22, 2021

(30) Foreign Application Priority Data
Jun. 4, 2018  (JP) .............................. JP2018-107042

(51) Int. Cl.
*G06F 15/16*  (2006.01)
*H04L 1/22*  (2006.01)
(Continued)

(52) U.S. Cl.
CPC ............ *H04L 1/22* (2013.01); *G06F 9/45558* (2013.01); *H04L 41/5045* (2013.01);
(Continued)

(58) Field of Classification Search
CPC . H04L 1/22; H04L 43/16; H04L 45/28; G06F 2009/4557
See application file for complete search history.

(56) References Cited

U.S. PATENT DOCUMENTS 8,010,942 B1 * 8/2011 Mirza ....................... G06F 8/34
717/109
9,882,828 B1 * 1/2018 Sandlerman ............ H04L 47/74
(Continued)

FOREIGN PATENT DOCUMENTS

JP        2014-150441        8/2014

*Primary Examiner* — Hieu T Hoang
(74) *Attorney, Agent, or Firm* — Fish & Richardson P.C.

(57) ABSTRACT

Implementations are directed to designing a redundant configuration for a virtualized network function with cost efficiency while improving reliability of entire service chain. A service chain design apparatus includes a redundancy target VNF determining unit that defines, as importance of each VNF, at least one of the number of service chains using the VNF or the number of accommodated users in the service chains using the VNF, and determines a VNF having high importance as a redundancy target VNF, and a redundancy determining unit that determines, when importance of the redundancy target VNF determined by the redundancy target VNF determining unit exceeds a predetermined threshold, the redundancy target VNF having the importance exceeding the predetermined threshold as a redundancy execution VNF.

18 Claims, 8 Drawing Sheets

(51) Int. Cl.
*G06F 9/455* (2018.01)
*H04L 41/5041* (2022.01)
*H04L 43/16* (2022.01)
*H04L 45/28* (2022.01)

(52) U.S. Cl.
CPC .............. *H04L 43/16* (2013.01); *H04L 45/28* (2013.01); *G06F 2009/4557* (2013.01); *G06F 2009/45595* (2013.01)

(56) References Cited

U.S. PATENT DOCUMENTS

| | | | | |
|---|---|---|---|---|
| 10,467,040 B2* | 11/2019 | Yousaf | ................ | H04L 43/0817 |
| 10,680,896 B2* | 6/2020 | Ellappan | ............. | G06F 9/45558 |
| 2011/0105130 A1* | 5/2011 | Chandrasekaran | ..... | H04W 4/06 |
| | | | | 455/445 |
| 2015/0295849 A1* | 10/2015 | Xia | .................... | H04L 41/5041 |
| | | | | 370/235 |
| 2015/0319762 A1* | 11/2015 | To | ......................... | H04W 48/17 |
| | | | | 370/329 |
| 2015/0365352 A1* | 12/2015 | Xiang | ................. | H04L 41/0806 |
| | | | | 709/226 |
| 2016/0182684 A1* | 6/2016 | Connor | ............... | G06F 9/45558 |
| | | | | 709/203 |
| 2017/0302543 A1* | 10/2017 | Wu | ...................... | H04L 43/0817 |
| 2017/0331884 A1* | 11/2017 | Colle | ................... | H04L 41/0659 |
| 2018/0063767 A1* | 3/2018 | Matos | ................. | H04W 40/026 |
| 2018/0227179 A1* | 8/2018 | Ding | ................... | G06F 9/45558 |
| 2019/0028350 A1* | 1/2019 | Yeung | ................... | H04L 9/0894 |
| 2019/0079804 A1* | 3/2019 | Thyagarajan | ....... | G06F 9/45533 |
| 2019/0123966 A1* | 4/2019 | Boutros | .................... | G06F 9/54 |
| 2019/0132211 A1* | 5/2019 | Yeung | ................ | H04L 41/0816 |
| 2019/0190795 A1* | 6/2019 | Kim | ................... | H04L 43/0805 |
| 2019/0334781 A1* | 10/2019 | Caldwell | ............ | G06F 9/45558 |
| 2020/0015102 A1* | 1/2020 | Sun | ...................... | H04L 41/0823 |
| 2020/0076686 A1* | 3/2020 | Krug | ........................ | H04L 45/74 |
| 2020/0138693 A1* | 5/2020 | Liu | ........................ | A61K 8/891 |
| 2020/0229080 A1* | 7/2020 | Xu | ........................ | H04W 48/18 |

* cited by examiner

SERVICE CHAIN DESIGNING DEVICE, SERVICE CHAIN DESIGNING METHOD, AND SERVICE CHAIN DESIGNING PROGRAM

CROSS-REFERENCE TO RELATED APPLICATIONS

This application is a National Stage application under 35 U.S.C. § 371 of International Application No. PCT/JP2019/021127, having an International Filing Date of May 28, 2019, which claims priority to Japanese Application Serial No. 2018-107042, filed on Jun. 4, 2018. The disclosure of the prior application is considered part of the disclosure of this application, and is incorporated in its entirety into this application.

TECHNICAL FIELD

The present invention relates to a service chain design apparatus, a service chain design method, and a service chain design program.

BACKGROUND ART

A technique in which a spare calculator is prepared in advance before a fault occurs in a system and, if a fault occurs, the processing is taken over by the spare calculator is called design with redundancy. This design with redundancy can provide a system with excellent fault tolerance and high reliability. As a way to improve service reliability, a redundant configuration is employed, such as doubling components in a service (paths, various apparatuses, applications, etc.).

Patent Literature 1 describes a communication path output technique in which, in designing a redundant communication path within each of a plurality of subnetwork into which an entire network is divided, a path candidate that shares hardware resources, such as fiber overlap, node overlap, and communication pipeline overlap, is not used wherever practicable, from among a plurality of path candidates designed with redundancy.

CITATION LIST

Patent Literature

PTL 1: JP 2014-150441 A

SUMMARY OF THE INVENTION

Technical Problem

In existing network services, various network functions have been provided in physical devices (appliances). Such a physical device serving as a provider of the network functions is fixed, which results in the lack of flexibility. Thus, an attempt to apply virtualization technology for constructing a Virtual Machine (VM) using a physical device to a network resource is becoming popular.

Network Function Virtualization (NFV) is a virtualization technology in which various network functions are provided in a virtual machine (software). The virtual machine provides flexibility in the placement of network functions, which allows flexible response to individual requirements of users.

The network function virtualized by the NFV technology is referred to as a Virtualized Network Function (VNF). Examples of the VNF include Virtualized Customer Premises Equipment (vCPE), vRouter, vMitigator, Virtualized Firewall (vFW), Virtualized Load Balancer (vLB), and Virtualized deep packet inspection (vDPI).

A technology of making the VNF flexibly selectable and available for each user is called service chaining. A series of services provided by the service chaining is called a service chain.

With the service chain, the network functions that have been provided in a dedicated appliance can be implemented in a software (virtual machine) group on a virtualization infrastructure. That is, with the NFV technology, the network devices are separated into software and hardware, and a network function group implemented on the virtualization infrastructure composed of general-purpose servers is provided as one service by tying the network function group in a row by service chaining.

FIG. 7 is an explanatory diagram of a service chain.

First, as an appliance of a physical resource, a physical network system is constructed in which physical nodes [N1, . . . , N11] are connected by physical links [L1, . . . , L14]. For example, a physical node N4 and a physical node N8 are connected by a physical link L8.

It is assumed that virtual nodes [VM1 . . . . , VM6] are formed on the physical nodes, and VNFs [F1, . . . , F4] are operating on the virtual nodes. For example, F1 of the VNF is operating on a virtual node VM1.

Furthermore, one or more VNFs are bundled together by each of service chains [A, B, C]. Here, variation occurs in the VNF used by each of the service chains, that is, there are a VNF of high load with access concentration and a VNF of low load with no access concentration. Details of the VNF used by each of the service chains will be described below with reference to FIG. 8.

FIG. 8 is a detailed explanatory diagram of a service chain constructed on the physical network system of FIG. 7.

A reference sign 109 indicates a path tracing physical resources and virtual resources from a starting point to an ending point in an order, which has been passed through by each of the service chains [A, B, C] in FIG. 7.

The service chain A starts from the physical node N1 of starting point, and uses the VNF "F2" on the VM3 and the VNF "F3" on the VM5 of ending point.

The service chain B starts from the physical node N1 of starting point, and uses the VNF "F3" on the VM5 and the VNF "F1" on the VM1 of ending point.

The service chain C starts from the physical node N3 of starting point, and uses the VNF "F4" on the VM6, the VNF "F3" on the VM5, and the VNF "F2" on the VM3 of ending point.

That is, the VNF "F3" is used by three service chains A to C, the VNF "F2" is used by two service chains A and C, the VNF "F1" is used only by the service chain B, and the VNF "F4" is used only by the service chain C.

Furthermore, a table 209a shows the number of accommodated users for each service chain, showing that the service chain A accommodates 100 users, which is the largest number. A table 209b shows situations of the service chains with a focus on each VNF indicated by a VNF ID. As described above in the description of the reference sign 109, the VNF "F3" is used by three service chains A to C (i.e., the number of services is 3) and the sum of the number of users in these service chains (=180) is largest, thus an impact at failure is greater than that of other VNFs (highlighted by hatching in the figure).

Returning now to a discussion of a redundant design of the network. As suggested in PTL 1 and the like, from the viewpoint of reliability, when the network is to be designed with redundancy by using a plurality of paths, it is desirable to provide as many physical resources as possible to reduce commonly used physical resources. This is because if the commonly used physical resources go down due to a system fault, all of redundant paths using the physical resources become unavailable at the same time, and are excluded from a switching target after the occurrence of the fault.

On the other hand, from the perspective of a network operator, in the redundant design of the network, a physical resource that is prepared as a spare resource for redundancy becomes an idle resource in normal time, resulting in the waste of resources. Thus, from the viewpoint of cost, it is preferable that there are fewer physical resources for redundancy.

As described above, in integrally considering the viewpoint of reliability and the viewpoint of cost, in the redundant design of the network, a well-adapted and well-balanced design is required, for example, in which an important portion which may have greater impact when a failure occurs is designed to have a higher level of redundancy to ensure reliability and a portion which may have lesser impact when a failure occurs is designed to have a lower level of redundancy to save the cost.

For example, in the configurations of the service chains as illustrated in FIGS. 7 and 8, it is desirable that the level of redundancy of the VNF "F3" that affects many users at the time of failure (i.e., interrupts services and causes many users to experience the inconvenience of waiting time) be designed to be higher than those of other VNFs.

Thus, a main object of the present invention is to design a redundant configuration for a virtualized network function with excellent cost efficiency while improving reliability of entire service chain.

Means for Solving the Problem

To solve the above-described problems, a service chain design apparatus of the present invention has the following features:

The present invention includes a first determining unit configured to define, as importance of each of VNFs, at least one of the number of service chains using the VNF or the number of accommodated users in the service chains using the VNF, and determine a VNF having high importance as a redundancy target VNF;

a second determining unit configured to determine, when importance of the redundancy target VNF determined by the first determining unit exceeds a predetermined threshold, the redundancy target VNF having the importance exceeding the predetermined threshold as a redundancy execution VNF; and a redundancy level calculation unit configured to calculate, for the redundancy execution VNF determined by the second determining unit, the number of new redundancy execution VNFs to be generated serving as load distribution destinations for a service chain using the redundancy execution VNF, so that the importance of the redundancy execution VNF determined by the second determining unit becomes lower than the predetermined threshold.

As a result, it is possible to design a service chain with high reliability by selecting a redundancy target VNF based on, as the importance, a parameter directly affecting services and users, such as the number of service chains using the VNF and the number of accommodated users in the VNF.

Furthermore, by selecting important VNFs as the redundancy target VNFs, it is possible to design a redundant configuration of a virtualized network function with excellent cost efficiency.

In the present invention, the first determining unit is configured to define, as the importance of each VNF, in addition to the number of service chains and the number of accommodated users, at least one of weight set so that higher importance is set as a position of the VNF in a service chain is located more rearward in a route or weight set so that higher importance is set as the VNF consumes more resources in a preceding stage in a service chain.

As a result, in a case where the weight set so that higher importance is set as located more rearward in a route is selected, a VNF located more rearward in the route of the service chain will have a higher likelihood of being redundantly generated, and thus, it is possible to reduce influence caused by redoing processing from a starting point of the service chain due to the occurrence of VNF fault.

Even in a case where the weight set so that higher importance is set as a VNF consumes more resources in a preceding stage is selected, it is possible to reduce the influence caused by redoing processing from the starting point of the service chain due to the occurrence of VNF fault.

In the present invention, the first determining unit is configured to calculate the importance of each VNF based on, in addition to the number of service chains and the number of accommodated users, at least one of weight of service contents provided by the VNF or weight of users accommodated in a service chain.

As a result, in a case where the weight of service contents or the weight of users is selected, a VNF having an important service or an important user is preferentially redundantly generated, and thus, a level of user satisfaction can be improved.

In the present invention, the second determining unit is configured to determine whether the importance of the redundancy target VNF exceeds the predetermined threshold, based on measurement data of performance value of the VNF.

As a result, a VNF in which variable load of VNF increases is preferentially redundantly generated, and thus, more practical reliability design can be achieved.

In the present invention, the service chain design apparatus further includes a placement deciding unit and a redundant route deciding unit, in which the placement deciding unit is configured to decide placement destinations for the new redundancy execution VNFs, the number of the placement destinations corresponds to the number of the new redundancy execution VNFs to be generated calculated by the redundancy level calculation unit, and the placement destinations for a plurality of the redundancy execution VNFs are set to be on different physical servers, and the redundant route deciding unit is configured to decide redundant routes each passing through each of the placement destinations decided by the placement deciding unit so that an overlapping path between the redundant routes in each of the service chains is minimized.

In this way, reducing hardware resources that overlap between the plurality of VNFs or between the plurality of redundant routes can secure a large number of survival VNFs and survival redundant routes even when one hardware resource fails, and thus, a design with high reliability can be achieved.

In the present invention, the service chain design apparatus further includes a placement deciding unit and a redundant route deciding unit, in which the placement deciding unit is configured to decide placement destinations for the new redundancy execution VNFs, the number of the placement destinations corresponds to the number of the new redundancy execution VNFs to be generated calculated by the redundancy level calculation unit, and the placement destinations for a plurality of the redundancy execution VNFs are set to be on different physical servers, and the redundant route deciding unit is configured to place a load balancer in a redundant route immediately before the placement destination of the redundancy execution VNF decided by the placement deciding unit, and decide a redundant route that passes through each of the plurality of redundancy execution VNFs via the load balancer.

As a result, the number of devices to be subjected to the configuration change is reduced, and thus, an operation becomes easier and the risk of affecting other services due to the configuration change can be reduced.

Effects of the Invention

According to the present invention, it is possible to design a redundant configuration for a virtualized network function with excellent cost efficiency while improving reliability of entire service chain.

DESCRIPTION OF EMBODIMENTS

An embodiment of the present invention will be described in detail below with reference to the drawings.

Figure 1:
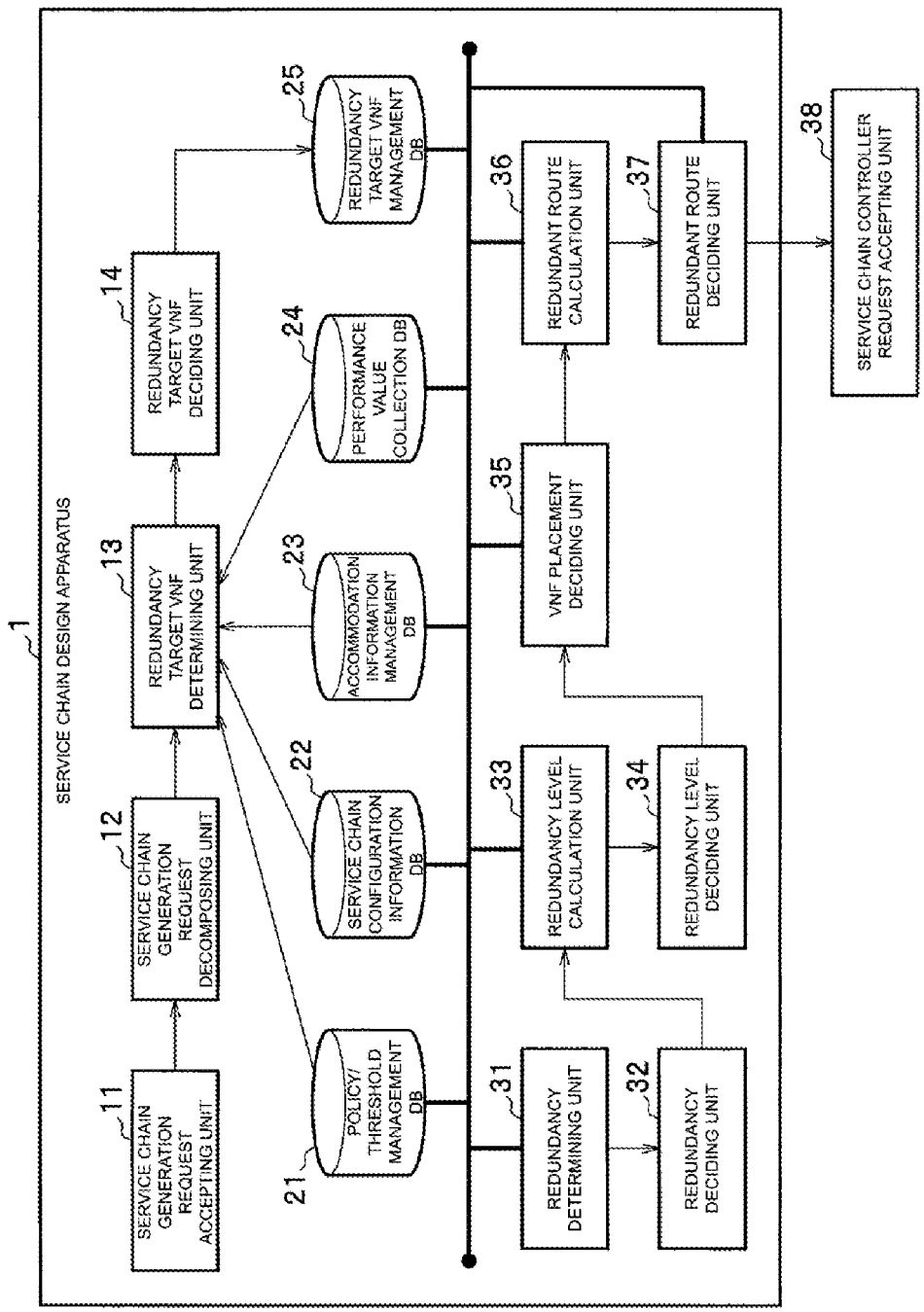
FIG. 1 is a configuration diagram of a service chain design apparatus according to a present embodiment.

FIG. 1 is a configuration diagram of a service chain design apparatus 1.

The service chain design apparatus 1 is a computer that includes a Central Processing Unit (CPU), a memory, storage means (storage unit) such as a hard disk, and a network interface.

The CPU executes a program (also referred to as an application or an app, which is an abbreviation therefor) read into the memory, and thus, the computer operates a control unit (control means) including various processing units.

Figure 8:
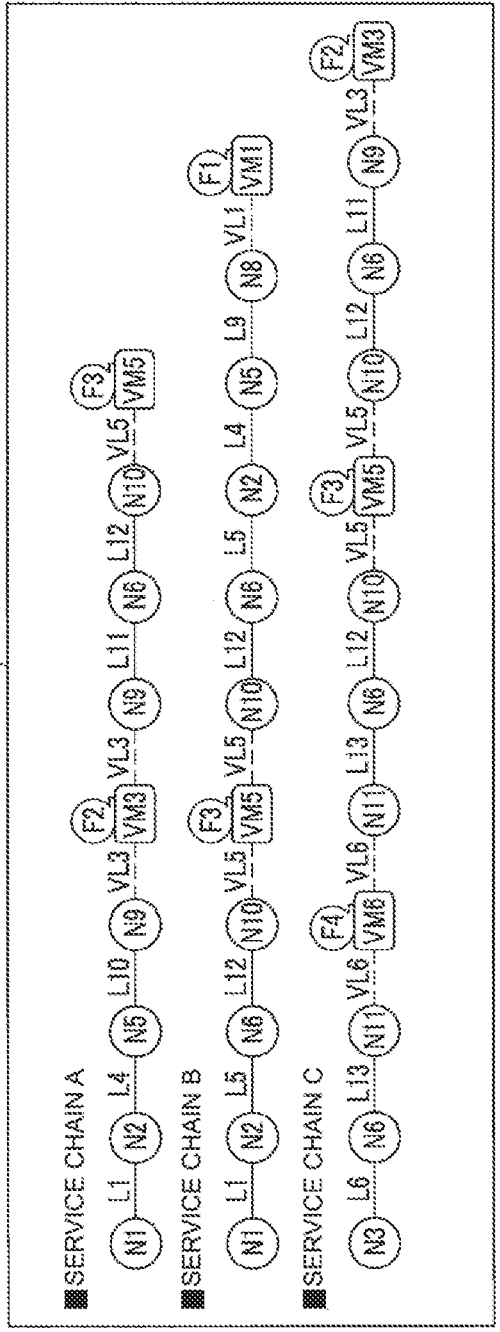
FIG. 8 is a detailed explanatory diagram of a service chain constructed on a physical network system in FIG. 7.

A VNF included in a service chain handled by the service chain design apparatus 1 is defined as follows:

First, the service chain design apparatus 1 specifies, of all VNFs operating on a physical network system, an important VNF that affects many users at the time of failure as a "redundancy target VNF." For example, a VNF "F3" in FIG. 8 is an example of the redundancy target VNF.

Next, the service chain design apparatus 1 decides, when the "redundancy target VNF" satisfies a predetermined criterion, the redundancy target VNF as a VNF to be actually redundantly generated (hereinafter referred to as "redundancy execution VNF"). That is, the VNF to be actually redundantly generated is decided through steps of "all VNFs->redundancy target VNF->redundancy execution VNF." In other words, it has not been decided whether the VNF is to be actually redundantly generated when just being elected as the redundancy target VNF.

The service chain design apparatus 1 includes, as a database storing various data, a policy/threshold management DB 21, a service chain configuration information DB 22, an accommodation information management DB 23, a performance value collection DB 24, and a redundancy target VNF management DB 25.

The service chain design apparatus 1 includes, as a processing unit that elects a "redundancy target VNF," a service chain generation request accepting unit 11, a service chain generation request decomposing unit 12, a redundancy target VNF determining unit (first determining unit) 13, and a redundancy target VNF deciding unit 14.

The service chain design apparatus 1 includes, as a processing unit that decides an elected "redundancy target VNF" as a "redundancy execution VNF," a redundancy determining unit (second determining unit) 31, a redundancy deciding unit 32, a redundancy level calculation unit 33, a redundancy level deciding unit 34, a VNF placement deciding unit 35, a redundant route calculation unit 36, and a redundant route deciding unit 37.

Furthermore, the redundant route deciding unit 37 is connected to a service chain controller request accepting unit 38 external to the service chain design apparatus 1, to actually redundantly generate a decided "redundancy execution VNF".

These components of the service chain design apparatus 1 will be described below based on specific examples of FIGS. 2 and 3.

Figure 2:
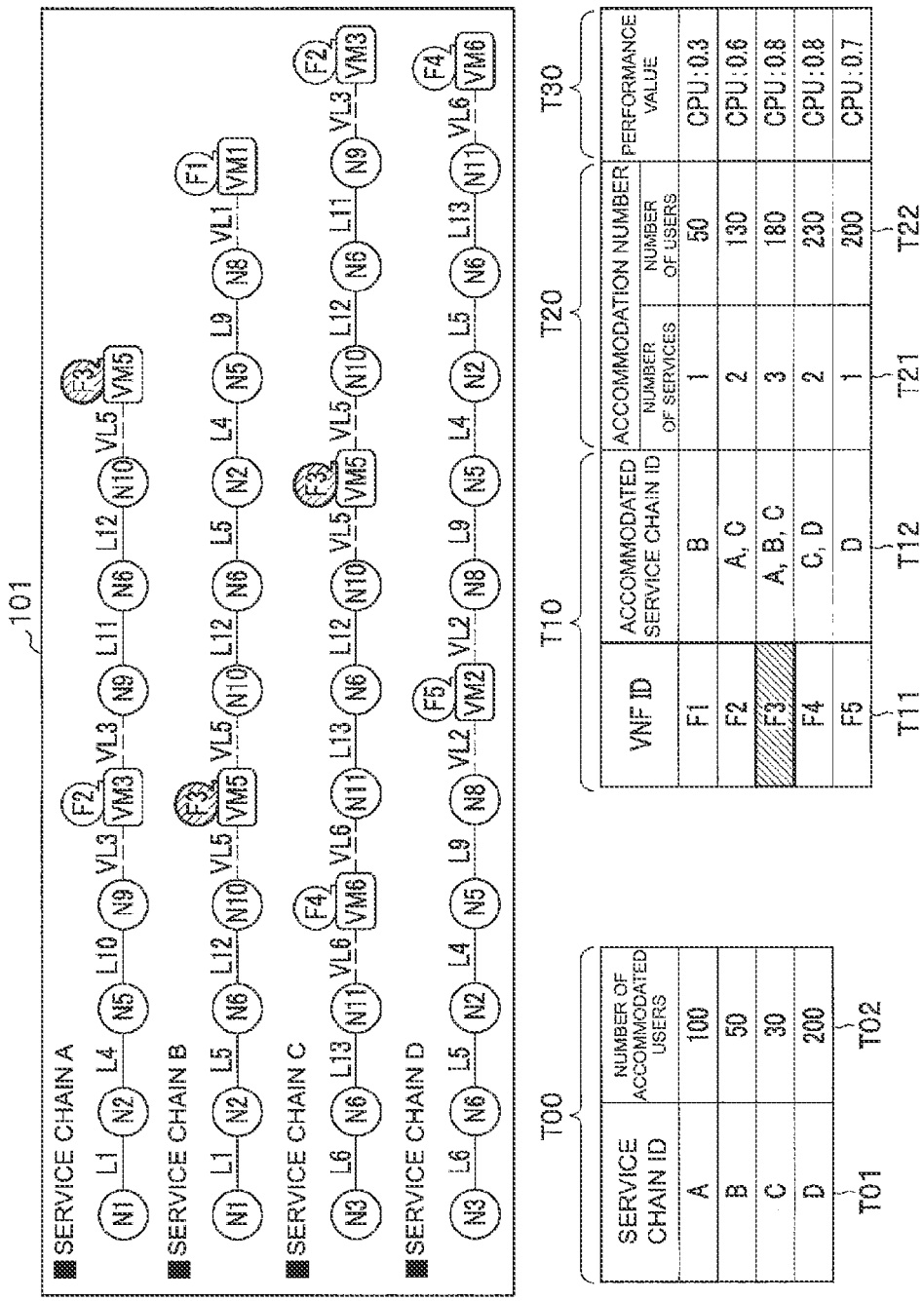
FIG. 2 is a configuration diagram of data relating to a service chain handled by the service chain design apparatus according to the present embodiment.

FIG. 2 is a configuration diagram of data relating to a service chain handled by the service chain design apparatus 1.

In a reference sign 101, a service chain D is newly added to the service chains A to C of the reference sign 109 in FIG. 8. These service chains A to D use five VNFs, which are VNFs "F1" to "F5."

A table T00 shows, as with a table 209a in FIG. 8, the number of accommodated users T02 for each service chain ID T01 of the reference sign 101. It can be said that the service chain D accommodating 200 users, which the largest number, is the most influential service chain among the service chains.

As with a table 209b in FIG. 8, tables T10, T20, and T30 show situations of the service chains with a focus on each VNF indicated by a VNF ID T11. As with the table 209b in FIG. 8, an accommodated service chain ID T12 and an accommodation number T20 (the number of services T21, the number of users T22) are associated for each VNF ID T11. Furthermore, in FIG. 2, a performance value T30 (CPU usage, when a value of 1 represents 100%) for each VNF ID T11 is also associated.

Such tables T00, T10, T20, and T30 show a result obtained by decomposing, by the service chain generation request decomposing unit 12, each of service chain generation orders accepted by the service chain generation request accepting unit 11.

As a result of determining, by the redundancy target VNF determining unit 13, a VNF having the largest number of services T21 based on the contents in the tables T00, T10, T20, and T30, the highlighted VNF "F3" is decided as the "redundancy target VNF" by the redundancy target VNF deciding unit 14.

Figure 3:
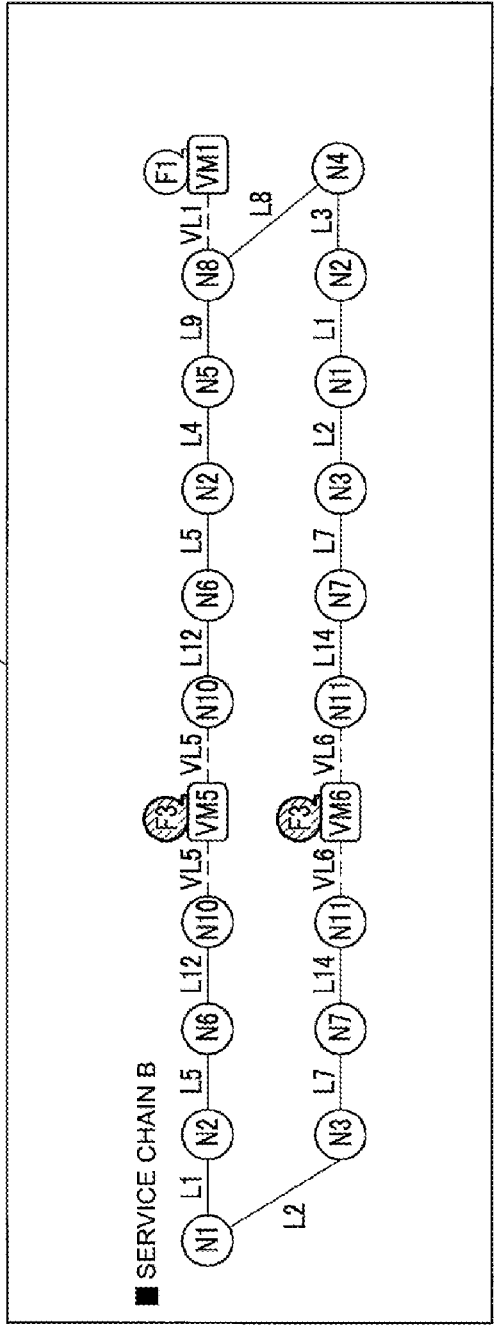
FIG. 3 is a configuration diagram of data after a VNF on a service chain B in FIG. 2 is redundantly generated according to the present embodiment.

FIG. 3 is a configuration diagram of data after the VNF "F3" on the service chain B in FIG. 2 is redundantly generated.

Figure 7:
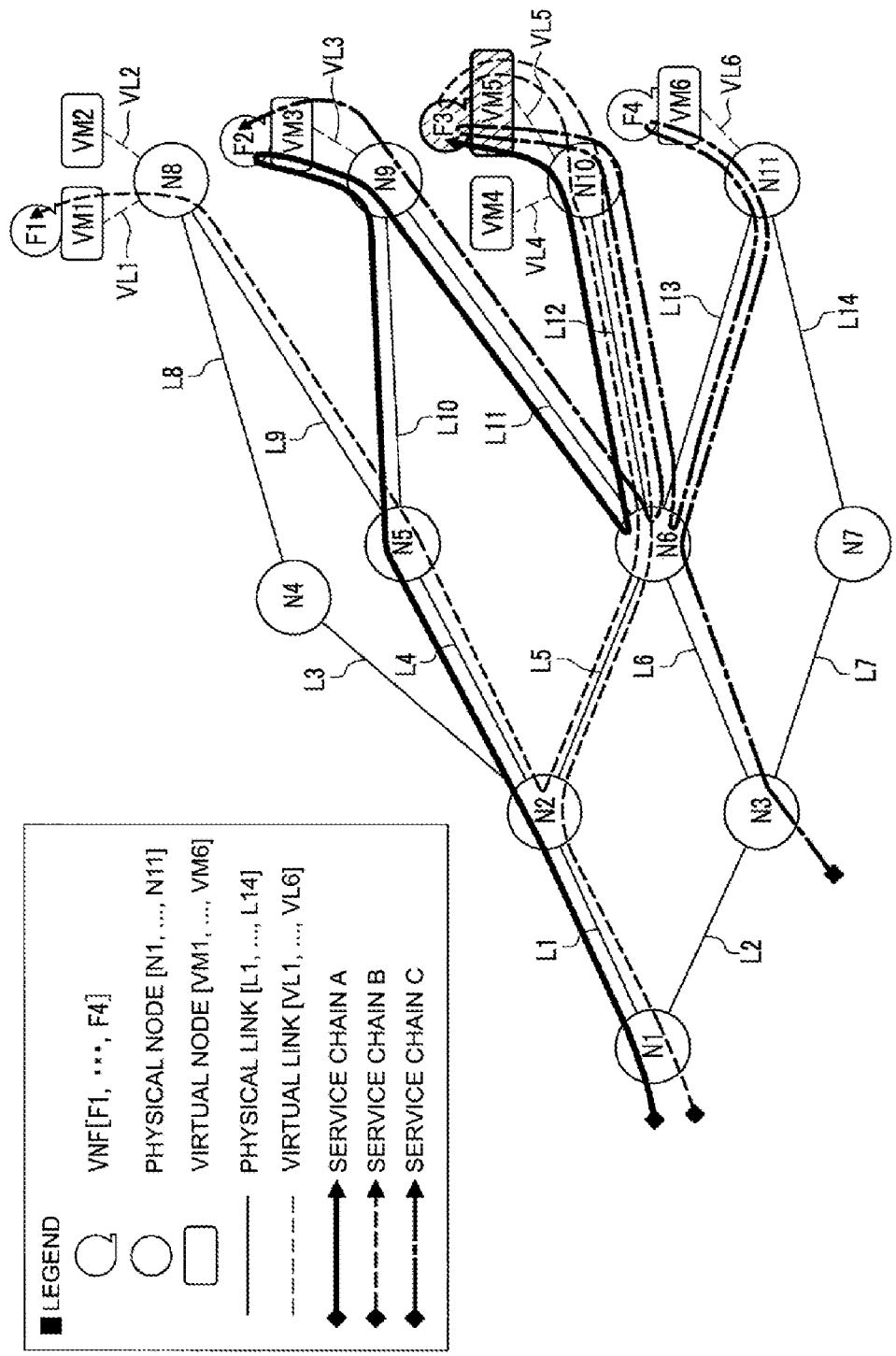
FIG. 7 is an explanatory diagram of a service chain.

A reference sign 102 indicates, as with the reference sign 101 in FIG. 2, the service chain B constructed on a physical network system in FIG. 7.

When the reference sign 101 and the reference sign 102 are compared, in the service chain B indicated by the reference sign 102, the second VNF "F3" on a bypass from a starting point node N1, "N3->N7->N11->VM6->N11->N7->N3->N->N2->N4->N8", is redundantly generated.

In tables T11 and T40 (the number of services T41, the number of users T42, performance value T43), a threshold, which is used by the redundancy determining unit 31 to determine whether to define a "redundancy target VNF" as a "redundancy execution VNF," is associated for each VNF ID T11. For example, the number of services T41 of "≥5 (5 or more)" indicates that a "redundancy target VNF" is to be defined as a "redundancy execution VNF" when the number of services T21 in FIG. 2 becomes 5 or more.

That is, the number of services T21 is 3 in FIG. 2, which does not satisfy the number of services T41 of "≥5," and thus the redundancy determining unit 31 determines not yet to define the redundancy target VNF "F3" as a redundancy execution VNF. On the other hand, if the number of service chains using the VNF "F3" is increased by two and thus satisfies the condition of the number of services T41 of "≥5" for the VNF "F3," then the redundancy deciding unit 32 decides to define the redundancy target VNF "F3" as a redundancy execution VNF.

Tables T11 and T50 (the number of services T51, the number of users T52, performance value T53) are referenced for specific calculation by the redundancy level calculation unit 33 for redundantly generating the redundancy execution VNFs "F3". For example, the highlighted number of services T51 of "2≤(2 or less)" indicates that, as a result of redundantly generating the redundancy execution VNFs "F3", at each point of the VNF "F3", the number of service chains using F3 at that point becomes 2 or less.

Thus, although the single VNF "F3" has accommodated "5" service chains before applying design with redundancy, the redundancy level deciding unit 34 decides that the redundancy level is 3 so that two VNFs "F3" are newly generated to make the VNF "F3" be present at three points in total. In other words, to satisfy the condition of the number of services T51 of "2≤(2 or less)," the five service chains may be distributed to make the numbers of accommodated services of VNFs "F3" be "1, 2, and 2".

That is, a threshold T50 immediately after applying design with redundancy is set to be lower than a redundancy deciding threshold T40, which allows a margin so that a determination of redundancy decision is not made for the second time immediately after applying design with redundancy for the first time.

The VNF placement deciding unit 35 decides the placement of the two newly generated VNFs "F3." Here, it is desirable that the total of three VNFs "F3," including new and old ones, be placed on different physical servers.

The redundant route calculation unit 36 and a route (path) of a service chain passing through the two newly generated VNFs "F3" are also newly generated. For example, as indicated by the reference sign 102, in the service chain B, the redundant route calculation unit 36 newly calculates a route that branches from a starting point node N3 that is present before the VNF "F3," passes through the VM6 on a node N11 where the VNF "F3" is present, and merges with a node N8 on an ending point side of the service chain B.

Here, in the example of the reference sign 102, it is desirable that the redundant route calculation unit 36 design each of the new paths not to overlap as much as possible, except that only the starting point side (N1) and the ending point side (N8) overlap before and after the branch.

The redundant route deciding unit 37 receives a calculation result of the redundant route calculation unit 36 and instructs the service chain controller request accepting unit 38 to set a new path.

Each of the processing units of the service chain design apparatus 1 has been described above by using specific examples with reference to FIGS. 2 and 3.

In the following, a general description will be given for each of the processing units and contents of each database of the service chain design apparatus 1. First, data contents stored in each of the databases indicated by the reference signs 21 to 25 will be described with reference to the tables T00 to T50 described in FIGS. 2 and 3.

The policy/threshold management DB 21 stores the redundancy deciding threshold T40 for each VNF ID T11 and the threshold T50 immediately after applying design with redundancy for each VNF ID T11. Here, a "policy" is preset information, which is not directly stored in the DB, such as "use the number of services T41 for the determination by the redundancy determining unit 31" or "use a combination of the number of users T42 and the performance value T43 for the determination by the redundancy determining unit 31."

The service chain configuration information DB 22 stores components of each of the service chains for each service chain ID T01, as indicated by the reference sign 101 in FIG. 2. For example, components of the service chain A, "N1->L1->N2->L4->N5->L10->N9->VL3->VM3->F2 (T11)->VL3->N9->L11->N6->L12->N10->VL5->VM5->F3 (T11)" is stored in the service chain configuration information DB 22.

The accommodation information management DB 23 stores, as accommodation information for each service chain ID T01, the number of accommodated users T02, the VNF ID T11 accommodated in the service chain, and the accommodation number T20.

The performance value collection DB 24 stores, as the performance value T30 measured and collected for each VNF ID T11, the CPU usage illustrated in FIG. 2, a delay time, a frequency band used, a memory used, the number of processes used, a traffic transmission and reception amount, a processing speed, and the like, which are not illustrated, as one or a plurality of combined values.

The redundancy target VNF management DB 25 stores the VNF ID T11 to be a redundancy target (F3 in FIG. 2) and the accommodated service chain ID T12 of the VNF ID T11.

Next, operations of each of the processing units will be described by using the databases indicated by the reference signs 21 to 25.

The service chain generation request accepting unit 11 accepts an order of generation of a new service chain.

The service chain generation request decomposing unit 12 performs decomposition processing on order contents accepted by the service chain generation request accepting unit 11, and writes the result of the decomposition processing to the service chain configuration information DB 22 and the accommodation information management DB 23.

As described below, the redundancy target VNF determining unit 13 refers to each of the databases to acquire data necessary for selecting a redundancy target VNF from among all VNFs.

Acquire VNF information for configuring a service chain, from the service chain configuration information DB 22.

Acquire policy information for deciding a redundancy target VNF, from the policy/threshold management DB 21.

Acquire the number of users, the number of services, and the like accommodated in each of the service chains, from the accommodation information management DB 23.

Acquire performance value information of a VNF included in each of the service chains, from the performance value collection DB 24.

Then, the redundancy target VNF determining unit 13 selects a candidate for the redundancy target VNF by using any of the techniques listed below. Which technique is to be used is specified by the acquired policy information.

(Technique 11) Allow a VNF, of which the number of accommodated service chains (=importance) is largest, to be defined as the redundancy target VNF.

(Technique 12) Allow a VNF, of which the number of accommodated users (=importance) is largest, to be defined as the redundancy target VNF.

(Technique 13) Allow a VNF, which provides a particularly important function as a service (for example, a VNF providing emergency handling service), to be defined as the redundancy target VNF.

(Technique 14) Allow a VNF, which accommodates an important user, to be defined as the redundancy target VNF.

(Technique 15) Allow a VNF, which is present at an important position in a service chain, to be defined as the redundancy target VNF (details will be described later in FIG. 4).

(Technique 16) Allow a VNF, which consumes more resources in a preceding stage, to be defined as the redundancy target VNF (details will be described later in FIG. 5).

The redundancy target VNF deciding unit 14 decides a redundancy target VNF by using one or more of results calculated by using (Technique 11) to (Technique 16) in the redundancy target VNF determining unit 13 (details will be described later in FIG. 6).

It is noted that parameters, such as the number of accommodated service chains and the number of accommodated users, are parameters of the importance for deciding a redundancy target VNF.

The redundancy determining unit 31 determines whether to define the redundancy target VNF decided by the redundancy target VNF deciding unit 14 as a redundancy execution VNF. This determination processing is processing of comparing each of thresholds of determination criteria to determine whether a current value (actual measurement value) exceeds the threshold, by referring to the policy/threshold management DB 21, the accommodation information management DB 23, and the performance value collection DB 24. The determination criteria are listed below.

(Criterion 21) If the number of accommodated service chains (=importance) exceeds any threshold, it is allowed to be defined as the redundancy execution VNF.

(Criterion 22) If the number of accommodated users (=importance) exceeds any threshold, it is allowed to be defined as the redundancy execution VNF.

(Criterion 23) If the performance value (=importance) exceeds any threshold, it is allowed to be defined as the redundancy execution VNF.

The redundancy deciding unit 32 uses the result of the redundancy determining unit 31 (whether one or more thresholds have been exceeded) to decide whether to finally define the redundancy target VNF as the redundancy execution VNF. The redundancy deciding unit 32 decides to perform design with redundancy if, for example, both of the thresholds of (Criterion 21) and (Criterion 22) have been exceeded.

The redundancy level calculation unit 33 divides the parameters for redundancy determination (the number of accommodated service chains, the number of accommodated users, the performance value) so that each parameter becomes less than or equal to any threshold, and newly generates a VNF corresponding to the number of divisions. For this reason, the redundancy level calculation unit 33 refers to the policy/threshold management DB 21, the accommodation information management DB 23, and the performance value collection DB 24. The redundancy level deciding unit 34 uses the result of the redundancy level calculation unit 33 (one or more redundancy levels) to decide the number of new generations of the target VNF. For example, a case is assumed that in focusing on the number of accommodated service chains, the number of new generations of the target VNF becomes 2, and in focusing on the performance value, the number of new generations becomes 3. The redundancy level deciding unit 34 employs the largest number out of the number of new generations of 2 and 3, and finally decides the number of new generations of the VNF as 3.

The VNF placement deciding unit 35 decides the placement of the newly generated VNFs to make each of the redundancy execution VNFs be placed on different physical servers as much as possible, by referring to the service chain configuration information DB 22 and the performance value collection DB 24. As a result, even when one physical server fails, if other physical servers are survived, the redundancy execution VNF in any one of the survived servers continues functioning, and thus, the reliability can be improved.

The redundant route calculation unit 36 refers to the service chain configuration information DB 22 and the performance value collection DB 24 to calculate a redundant route based on the placement of each of the newly generated VNFs decided by the VNF placement deciding unit 35. A method of calculating a redundant route is listed below. The redundant route calculation unit 36 uses at least one of (Technique 31) to (Technique 33) to calculate a redundant route.

(Technique 31) Calculate, for each service chain, a new path between a server (or a starting point/ending point node) where a VNF placed immediately before/after the VNF to be a redundancy target is present and a server where a new VNF is present, by using the Dijkstra's algorithm or the like.

(Technique 32) In a plurality of the same type of VNFs that have been redundantly generated, exclude a path that has already been allocated from the target of the calculation. Alternatively, select a path that has been less shared. In this way, not generating path overlapping can prevent the occurrence of service interruption due to failure of both the active system and the standby system.

(Technique 33) Place a load balancer, such as a virtual Load Balancer (vLB), immediately before the VNF to be a redundancy target. A redundant route may be generated that passes through each of a plurality of redundancy execution VNFs (existing VNF and new VNF) via the load balancer. However, in this case, even though virtual paths are separated from each other, physical paths are not necessarily separated.

The redundant route deciding unit 37 uses the result of the redundant route calculation unit 36 (one or more redundant routes) to decide a redundant route for the newly generated VNF. The decided redundant route is added to the service chain configuration information DB 22. The service chain controller request accepting unit 38 accepts the following configuration information from the redundant route deciding unit 37, and reflects the configuration information in the physical network.

VNF ID of redundancy execution VNF
Number of generations of redundancy execution VNF
Physical server ID to which redundancy execution VNF is placed
Information of new redundant route passing through redundancy execution VNF The details of the components of the service chain design apparatus 1 have been described above with reference to FIGS. 1 to 3. A part of processing of the redundancy target VNF determining unit 13 and the redundancy target VNF deciding unit 14 will be supplementary described below with reference to FIGS. 4 to 6.

Figure 4:
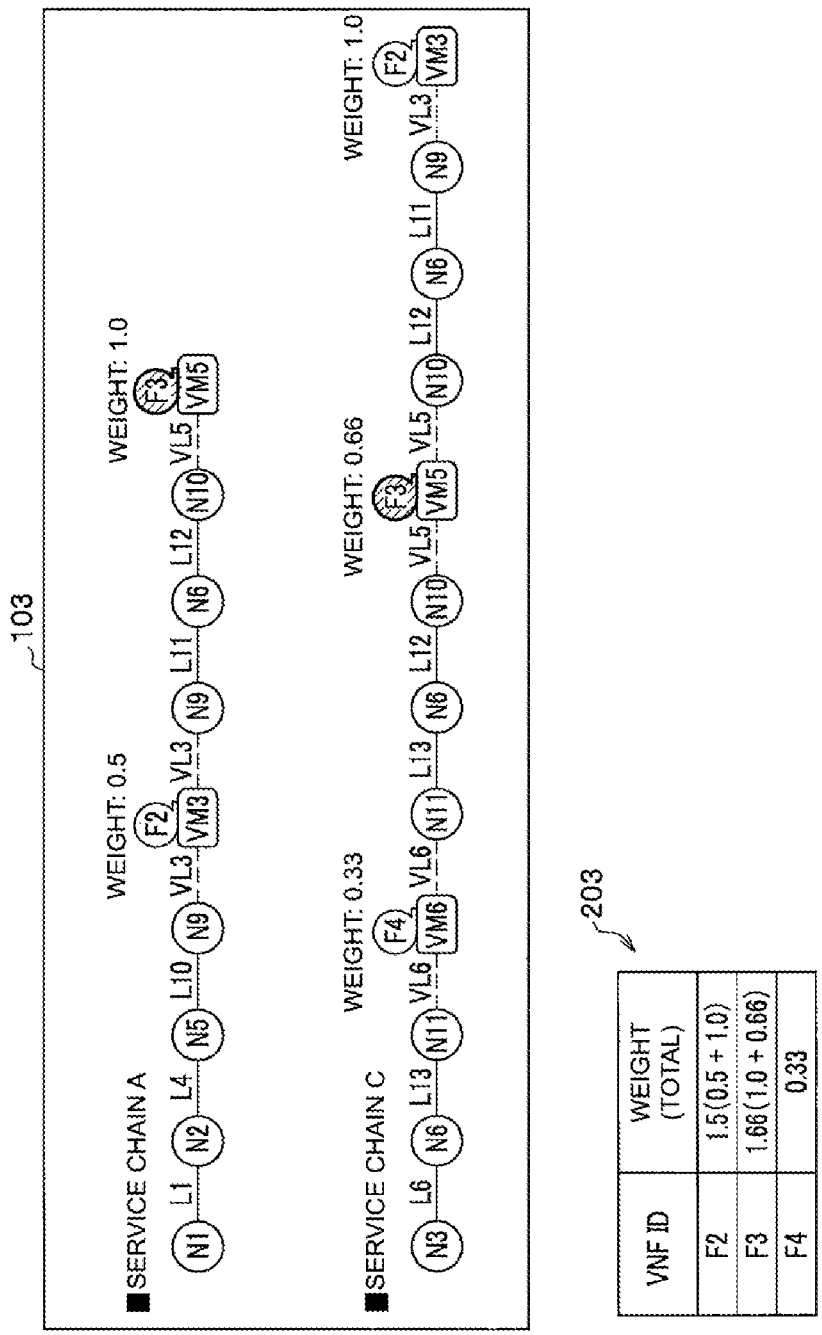
FIG. 4 is an explanatory diagram illustrating an example of processing of a redundancy target VNF determining unit according to the present embodiment.

FIG. 4 illustrates an example of processing of (Technique 15) of the redundancy target VNF determining unit 13.

In (Technique 15), the redundancy target VNF determining unit 13 determines to define a VNF that is present at an important position in a service chain as the redundancy target VNF. Here, the "VNF that is present at an important position" refers to the following two VNFs:

(A) VNF located at the end of the service chain is the VNF that is present at an important position. In the example of the reference sign 103, "F3" on the service chain A and "F2" on the service chain C are each located at the end.

(B) When weighting is performed depending on the position of VNF in the service chain (the weight as the importance is set higher as located more rearward in the chain), the VNF with the highest weight is the VNF that is present at an important position. In the example of the reference sign 103, "F3" on the service chain A is located more rearward than "F2" on the same service chain A, and thus, the weight is set to 1.0 that is higher than 0.5 of "F2" located forward. Then, as shown in a table 203, a total value of weights with respect to all the service chains is calculated for each VNF, and "F3" having the largest value of 1.66 is defined as the VNF that is present at an important position.

It is noted that the reason for setting the weights as in (A) and (B) is as follows: The service chain is processed by the VNFs in an order (sequentially) from the starting point of the route. For example, if the last VNF on the chain fails, the processing must be restarted from the beginning. In other words, processing performed in a preceding stage of the route is wasted, resulting in redoing all the processing. Thus, the VNF is set as important (redundancy target) as the VNF is located more rearward in the chain.

Figure 5:
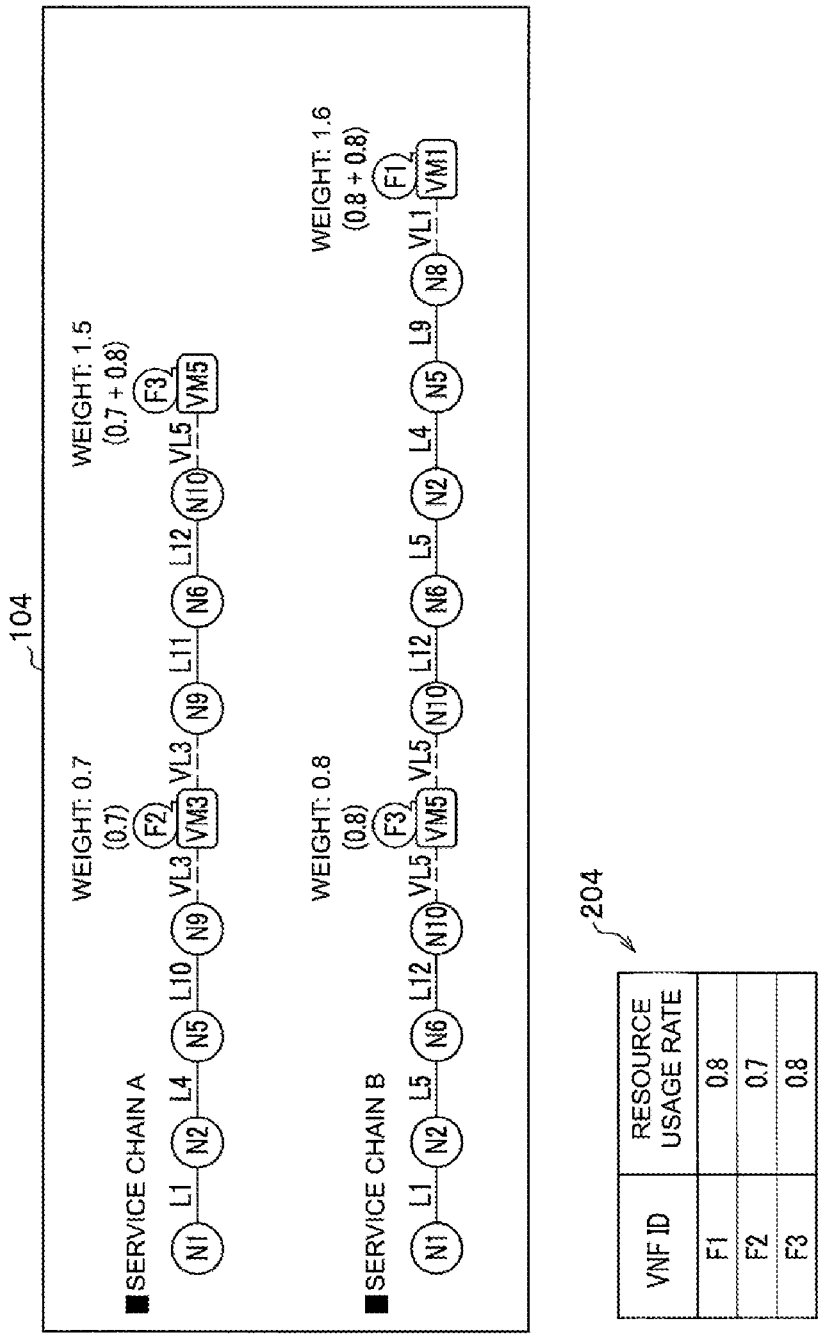
FIG. 5 is an explanatory diagram illustrating an example of processing of the redundancy target VNF determining unit according to the present embodiment.

FIG. 5 illustrates an example of processing of (Technique 16) of the redundancy target VNF determining unit 13.

In (Technique 16), the redundancy target VNF determining unit 13 determines to define a VNF consuming more resources in a preceding stage as the redundancy target VNF. The VNF consuming more resources in a preceding stage, which is the VNF with the highest weight, can be obtained as a result of performing weighting, for each VNF, based on the ratio of resource used in a preceding stage, for example.

In the example of FIG. 5, as shown in a table 204, a "resource usage rate" for each VNF is used for determining whether the processing is heavy. The higher resource usage rate shows that heavier processing is performed.

In the example of a reference sign 104, referring to the table 204, "F2" on the service chain A has the resource usage rate of 0.7. Then, the redundancy target VNF determining unit 13 obtains the weight of each VNF according to the calculation of the cumulative sum of (weight of own VNF)=(resource usage rate in preceding stage in service chain)+(own resource usage rate). That is, as with (Technique 15) in FIG. 4, the weight as the importance is increased as the VNF is located more rearward in the chain.

The weight of "F2" on the service chain A is: (own resource usage rate=0.7), and
the weight of "F3" on the service chain A is: (resource usage rate of preceding stage=0.7)+(own resource usage rate=0.8)=1.5.

Similarly, the redundancy target VNF determining unit 13 also obtains the weights of F3 and F1 on the service chain B.

Then, the redundancy target VNF determining unit 13 defines F1 having the highest weight value of 1.6 as the redundancy target VNF.

Furthermore, as described in (Technique 15) in FIG. 4, the redundancy target VNF determining unit 13 may define, as the redundancy target VNF, a VNF having the largest total value of weight with respect to all the service chains by using the weight of each of resource usage rates obtained by (Technique 16) in FIG. 5. For example, for three VNFs in FIG. 5, a total value of weight is obtained as follows:

Total value of weight of "F1" is 1.6
Total value of weight of "F2" is 0.7
Total value of weight of "F3" is 2.3 (=1.5+0.8)

Thus, "F3" having the largest total value of weight is defined as the redundancy target VNF.

Figure 6:
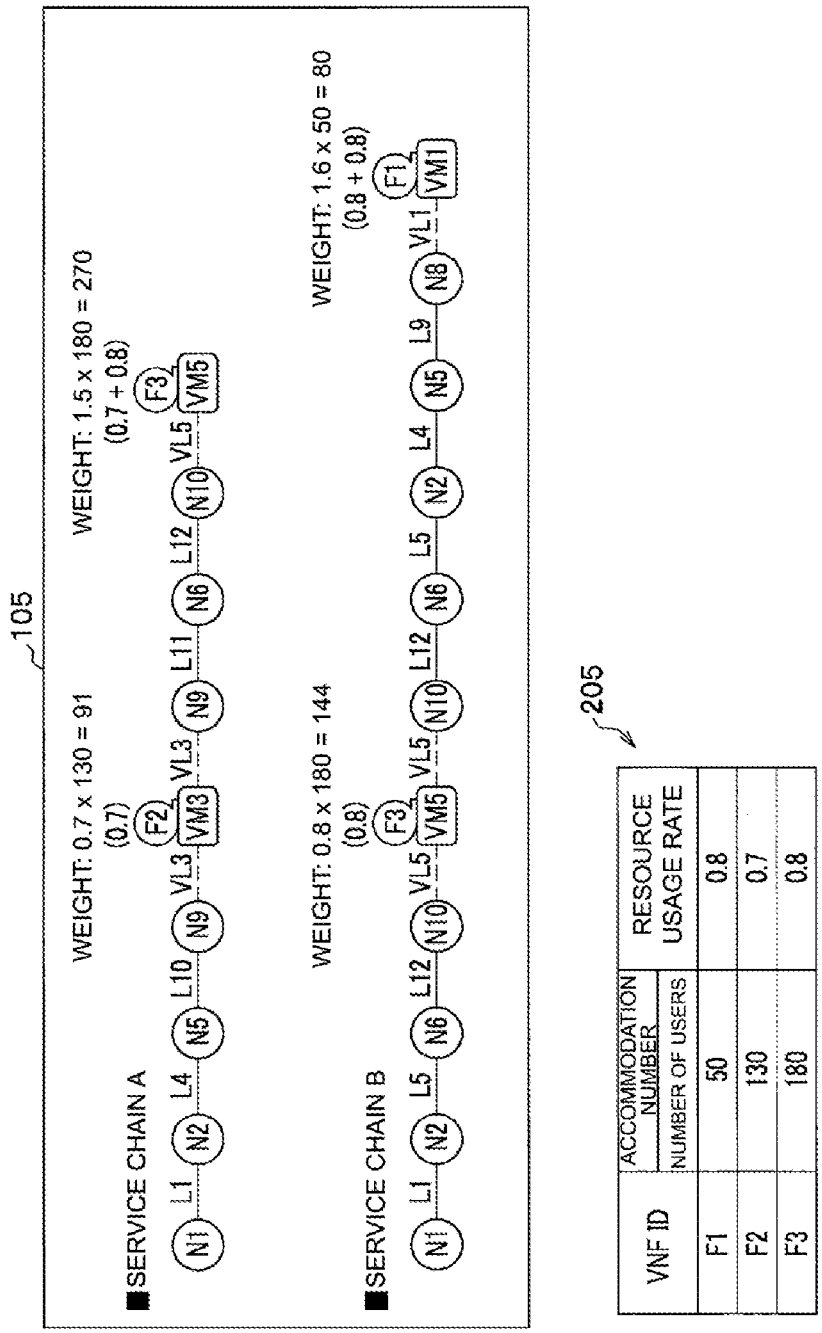
FIG. 6 is an explanatory diagram illustrating an example of processing of a redundancy target VNF deciding unit according to the present embodiment.

FIG. 6 illustrates an example of processing of the redundancy target VNF deciding unit 14.

The redundancy target VNF deciding unit 14 may decide a redundancy target VNF by using a combination of two or more of the results calculated by (Technique 11) to (Technique 16) of the redundancy target VNF determining unit 13. A specific example of the decision will be described below.

A table 205 shows, for each VNF, the number of users (that is, the number of users T22 in the accommodation number T20 shown in FIG. 2) for deciding the VNF of which the number of accommodated users is largest (Technique 12) and the resource usage rate for deciding the VNF consuming more resources in a preceding stage (Technique 16).

First, as described in FIG. 5, the weight of each of the VNFs is calculated according to (Technique 16). For example, the weight of F3 on the service chain A is: 0.7+0.8=1.5.

Next, the product of the weight in (Technique 16) and the number of users in (Technique 12) is calculated for each VNF. For example, the product of F3 on the service chain A is: (weight 1.5)×(number of users 180)=270. This product is the largest among the products of any other VNFs (i.e., the importance is the highest), and thus, the redundancy target VNF deciding unit 14 decides F3 as the redundancy target VNF.

The present embodiment described above describes a method of dynamically designing, by using the service chain design apparatus 1, a service chain with high reliability by redundantly generating VNFs used in the service chain.

It is noted that, as a comparative example, an operation method is assumed in which a plurality of service chains that provide a set of the same VNFs are prepared, and if a problem occurs in any one of the service chains, switching to another service chain is performed. However, in this comparative example, if a VNF shared by a plurality of service chains fails, many services or users will be affected in a process of switching from the failed VNF to another VNF.

For example, in a case where a certain VNF is shared by 100 service chains, if the certain VNF fails, 100 chains are switched to a backup system at the same time. As a result, 100 types of service impact and many users accommodated in the service chains will be affected.

On the other hand, in the present embodiment, the service chain design apparatus 1 individually performs redundant generation of the redundancy target VNF being a particularly important VNF which may have impact on many users, and thus the reliability of the entire service chain can be improved. Furthermore, higher reliability can be ensured by using a combination of designing with redundancy in a service chain unit as in the comparative example and designing with redundancy in an important VNF unit as in the present embodiment.

Furthermore, in the present embodiment, a configuration is described in which the redundancy target VNF determining unit 13, the redundancy target VNF deciding unit 14, the redundancy determining unit 31, and the redundancy deciding unit 32 are each provided as an individual function unit, allowing the design with redundancy to be performed by first deciding a VNF to be a redundancy target, then observing various thresholds for the target VNF. Alternatively, the redundancy target VNF determining unit 13, the redundancy target VNF deciding unit 14, the redundancy determining unit 31, and the redundancy deciding unit 32 may be implemented in the service chain design apparatus 1 as one function unit. In this case, the service chain design apparatus 1 operates to decide a redundancy target VNF while observing various thresholds for all VNFs during operation, and perform designing with redundancy at the same time.

Although it has been described in the present embodiment that the service chain design apparatus 1 according to the present invention handles four types of service chains A to D as illustrated in FIG. 2, the present invention is not limited to these numbers and configurations. The present invention can be achieved by using a program that cause hardware resources of a general computer to operate as each means of the service chain design apparatus 1. The program may also be distributed over a communications line, or may be recorded and distributed on a recording medium such as CD-ROM.

REFERENCE SIGNS LIST

1 Service chain design apparatus
11 Service chain generation request accepting unit
12 Service chain generation request decomposing unit
13 Redundancy target VNF determining unit (first determining unit)
14 Redundancy target VNF deciding unit
21 Policy/threshold management DB
22 Service chain configuration information DB
23 Accommodation information management DB
24 Performance value collection DB
25 Redundancy target VNF management DB
31 Redundancy determining unit (second determining unit)
32 Redundancy deciding unit
33 Redundancy level calculation unit
34 Redundancy level deciding unit
35 VNF placement deciding unit (placement deciding unit)
36 Redundant route calculation unit
37 Redundant route deciding unit
38 Service chain controller request accepting unit

The invention claimed is:

1. A service chain design apparatus comprising:
a first determining unit, including one or more processors, configured to define, as importance of each of Virtualized Network Functions (VNFs), based on at least one of a number of service chains using the VNF or a number of accommodated users in the service chains using the VNF, and a position of the VNF in a service chain, and determine a VNF having high importance as a redundancy target VNF, wherein a position located more rearward in a route of the service chain indicates higher importance;
a second determining unit, including one or more processors, configured to determine, when importance of the redundancy target VNF determined by the first determining unit exceeds a predetermined threshold, the redundancy target VNF having the importance exceeding the predetermined threshold as a redundancy execution VNF; and
a redundancy level calculation unit, including one or more processors, configured to calculate, for the redundancy execution VNF determined by the second determining unit, a number of new redundancy execution VNFs to be generated serving as load distribution destinations for a service chain using the redundancy execution VNF, so that the importance of the redundancy execution VNF determined by the second determining unit becomes lower than the predetermined threshold.

2. The service chain design apparatus according to claim 1, wherein the first determining unit is configured to define, as the importance of each VNF, in addition to the number of service chains and the number of accommodated users, based on at least one of:
a first weight that is set based on the position of the VNF is the service chain, so that the first weight indicates higher importance as the position of the VNF in a service chain is located more rearward in a route, or
a second weight that is set based on resources consumed by the VNF, so that the second weight indicates higher importance as the VNF consumes more resources in a preceding stage in a service chain.

3. The service chain design apparatus according to claim 2, wherein the first determining unit is configured to calculate the importance of each VNF based on, in addition to the number of service chains and the number of accommodated users, at least one of weight of service contents provided by the VNF or weight of users accommodated in a service chain.

4. The service chain design apparatus according to claim 1, wherein the second determining unit is configured to determine whether the importance of the redundancy target VNF exceeds the predetermined threshold, based on measurement data of a performance value of the VNF.

5. The service chain design apparatus according to claim 1, further comprising:
a placement deciding unit including one or more processors; and
a redundant route deciding unit including one or more processors, wherein the placement deciding unit is configured to decide placement destinations for the new redundancy execution VNFs, a number of the placement destinations corresponding to a number of the new redundancy execution VNFs to be generated calculated by the redundancy level calculation unit, the placement destinations for a plurality of the redundancy execution VNFs being set to be on different physical servers, and the redundant route deciding unit is configured to decide redundant routes each passing through each of the placement destinations decided by the placement deciding unit so that an overlapping path between the redundant routes in each of the service chains is minimized.

6. The service chain design apparatus according to claim 1 further comprising:

a placement deciding unit including one or more processors; and a redundant route deciding unit including one or more processors, wherein the placement deciding unit is configured to decide placement destinations for the new redundancy execution VNFs, a number of the placement destinations corresponding to a number of the new redundancy execution VNFs to be generated calculated by the redundancy level calculation unit, the placement destinations for a plurality of the redundancy execution VNFs being set to be on different physical servers, and the redundant route deciding unit configured to place a load balancer in a redundant route immediately before the placement destination of the redundancy execution VNF decided by the placement deciding unit, and decide a redundant route that passes through each of the plurality of redundancy execution VNFs via the load balancer.

7. A service chain design method for a service chain design apparatus including a first determining unit, a second determining unit, and a redundancy level calculation unit, the method comprising:

defining, by the first determining unit including one or more processors, as importance of each of Virtualized Network Functions (VNFs), based on at least one of a number of service chains using the VNF or a number of accommodated users in the service chains using the VNF, and a position of the VNF in a service chain, and determining a VNF having high importance as a redundancy target VNF, wherein a position located more rearward in a route of the service chain indicates higher importance;

determining, by the second determining unit including one or more processors, when importance of the redundancy target VNF determined by the first determining unit exceeds a predetermined threshold, the redundancy target VNF having the importance exceeding the predetermined threshold as a redundancy execution VNF; and calculating, by the redundancy level calculation unit including one or more processors, for the redundancy execution VNF determined by the second determining unit, a number of new redundancy execution VNFs to be generated serving as load distribution destinations for a service chain using the redundancy execution VNF, so that the importance of the redundancy execution VNF determined by the second determining unit becomes lower than the predetermined threshold.

8. The service chain design method according to claim 7, wherein the first determining unit defines, as the importance of each VNF, in addition to the number of service chains and the number of accommodated users, at least one of:

a first weight that is set based on the position of the VNF is the service chain, so that the first weight indicates higher importance as the position of the VNF in a service chain is located more rearward in a route, or a second weight that is set based on resources consumed by the VNF, so that the second weight indicates higher importance as the VNF consumes more resources in a preceding stage in a service chain.

9. The service chain design method according to claim 7, wherein the first determining unit calculates the importance of each VNF based on, in addition to the number of service chains and the number of accommodated users, at least one of weight of service contents provided by the VNF or weight of users accommodated in a service chain.

10. The service chain design method according to claim 7, wherein the second determining unit determines whether the importance of the redundancy target VNF exceeds the predetermined threshold, based on measurement data of a performance value of the VNF.

11. The service chain design method according to claim 7, further comprising:

deciding, by a placement deciding unit including one or more processors, placement destinations for the new redundancy execution VNFs, a number of the placement destinations corresponding to a number of the new redundancy execution VNFs to be generated calculated by the redundancy level calculation unit, the placement destinations for a plurality of the redundancy execution VNFs being set to be on different physical servers, and deciding, by a redundant route deciding unit including one or more processors, redundant routes each passing through each of the placement destinations decided by the placement deciding unit so that an overlapping path between the redundant routes in each of the service chains is minimized.

12. The service chain design method according to claim 7, further comprising:

deciding, by a placement deciding unit including one or more processors, placement destinations for the new redundancy execution VNFs, a number of the placement destinations corresponding to a number of the new redundancy execution VNFs to be generated calculated by the redundancy level calculation unit, the placement destinations for a plurality of the redundancy execution VNFs being set to be on different physical servers, and placing, by a redundant route deciding unit including one or more processors, a load balancer in a redundant route immediately before the placement destination of the redundancy execution VNF decided by the placement deciding unit, and decide a redundant route that passes through each of the plurality of redundancy execution VNFs via the load balancer.

13. A non-transitory computer readable medium storing one or more instructions causing a computer to execute:

defining, by a first determining unit including one or more processors, as importance of each of Virtualized Network Functions (VNFs), based on at least one of a number of service chains using the VNF or a number of accommodated users in the service chains using the VNF, and a position of the VNF in a service chain, and determining a VNF having high importance as a redundancy target VNF, wherein a position located more rearward in a route of the service chain indicates higher importance;

determining, by a second determining unit including one or more processors, when importance of the redundancy target VNF determined by the first determining unit exceeds a predetermined threshold, the redundancy target VNF having the importance exceeding the predetermined threshold as a redundancy execution VNF; and calculating, by a redundancy level calculation unit including one or more processors, for the redundancy execution VNF determined by the second determining unit, a number of new redundancy execution VNFs to be generated serving as load distribution destinations for a service chain using the redundancy execution VNF, so that the importance of the redundancy execution VNF determined by the second determining unit becomes lower than the predetermined threshold.

14. The non-transitory computer readable medium according to claim 13, wherein
the first determining unit defines, as the importance of each VNF, in addition to the number of service chains and the number of accommodated users, at least one of:
a first weight that is set based on the position of the VNF is the service chain, so that the first weight indicates higher importance as the position of the VNF in a service chain is located more rearward in a route, or
a second weight that is set based on resources consumed by the VNF, so that the second weight indicates higher importance as the VNF consumes more resources in a preceding stage in a service chain.

15. The non-transitory computer readable medium according to claim 13, wherein the first determining unit calculates the importance of each VNF based on, in addition to the number of service chains and the number of accommodated users, at least one of weight of service contents provided by the VNF or weight of users accommodated in a service chain.

16. The non-transitory computer readable medium according to claim 8, wherein the second determining unit determines whether the importance of the redundancy target VNF exceeds the predetermined threshold, based on measurement data of a performance value of the VNF.

17. The non-transitory computer readable medium according to claim 13, wherein the one or more instructions further cause the computer to execute:
deciding, by a placement deciding unit including one or more processors, placement destinations for the new redundancy execution VNFs, a number of the placement destinations corresponding to a number of the new redundancy execution VNFs to be generated calculated by the redundancy level calculation unit, the placement destinations for a plurality of the redundancy execution VNFs being set to be on different physical servers, and
deciding, by a redundant route deciding unit including one or more processors, redundant routes each passing through each of the placement destinations decided by the placement deciding unit so that an overlapping path between the redundant routes in each of the service chains is minimized.

18. The non-transitory computer readable medium according to claim 13 wherein the one or more instructions further cause the computer to execute:
deciding, by a placement deciding unit including one or more processors, placement destinations for the new redundancy execution VNFs, a number of the placement destinations corresponding to a number of the new redundancy execution VNFs to be generated calculated by the redundancy level calculation unit, the placement destinations for a plurality of the redundancy execution VNFs being set to be on different physical servers, and
placing, by a redundant route deciding unit including one or more processors, a load balancer in a redundant route immediately before the placement destination of the redundancy execution VNF decided by the placement deciding unit, and decide a redundant route that passes through each of the plurality of redundancy execution VNFs via the load balancer.

* * * * *